(12) United States Patent
Bugash et al.

(10) Patent No.: US 8,686,590 B2
(45) Date of Patent: Apr. 1, 2014

(54) WIRELESS POWER TRANSMISSION SYSTEM AND METHOD FOR AN AIRCRAFT SENSOR SYSTEM

(75) Inventors: Robert S. Bugash, Weybridge, VT (US); Scott T. Fusare, Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 514 days.

(21) Appl. No.: 13/047,493

(22) Filed: Mar. 14, 2011

(65) Prior Publication Data
US 2012/0234971 A1 Sep. 20, 2012

(51) Int. Cl.
*B60L 1/00* (2006.01)
(52) U.S. Cl.
USPC .......................... 307/9.1; 307/10.1
(58) Field of Classification Search
USPC .................................. 307/9.1, 10.1
See application file for complete search history.

(56) References Cited

U.S. PATENT DOCUMENTS

2009/0184877 A1* 7/2009 Bommer ................ 343/708
2012/0019057 A9* 1/2012 Kirby et al. ............ 307/9.1

* cited by examiner

*Primary Examiner* — Robert L. Deberadinis
(74) *Attorney, Agent, or Firm* — Edwards Wildman Palmer LLP; Scott D. Wofsy; Joshua L. Jones

(57) ABSTRACT

An aircraft sensor system including a primary module configured to be attached to an aircraft portion and operative to transmit electrical power wirelessly. A secondary module configured to be attached to an aircraft component, the secondary module operative to receive electrical power wirelessly from the primary module. At least one sensor configured to be operatively attached to a portion of the aircraft component and electrically coupled to the secondary module, wherein the at least one sensor is operative to measure a desired parameter of the aircraft component.

18 Claims, 4 Drawing Sheets

WIRELESS POWER TRANSMISSION SYSTEM AND METHOD FOR AN AIRCRAFT SENSOR SYSTEM

FIELD OF THE INVENTION

The present invention generally relates to a sensor system for use with an aircraft. More particularly, the present invention relates to an aircraft sensor system for use with a landing gear assembly which wirelessly receives electrical power for operation thereof.

BACKGROUND OF THE INVENTION

Many aircraft are equipped with retractable landing gear to improve aerodynamics during flight. Such landing gear moves between a deployed (landing) position and a retracted (flying) position. As the landing gear is retracted and deployed during flight, it is important to create as little drag as possible.

However, previous retractable landing gear systems have several disadvantages. One such disadvantage being the need to use exposed wires extending the to sensor components provided on the landing gear. Theses exposed wires were needed to provide power and transfer data to and from the sensors. Such exposed wires and wire harnesses are susceptible to being worn and/damaged due to the frequent extension and retraction of the landing gear, thus comprising operation of the landing gear sensor components.

Therefore, what is needed is a retractable landing gear system that obviates the need for exposed wires and wire harnesses extending to sensor components of a landing gear assembly.

SUMMARY OF THE INVENTION

An aircraft sensor system is described in which an aspect of the invention, in accordance with the illustrated embodiments, includes a primary module configured to be attached to an aircraft portion, such as a portion of the aircraft landing bay. The primary module is operative to transmit electrical power wirelessly and may also be operative to receive data wirelessly. A secondary module is provided which is configured to be attached to an aircraft component, such as a landing gear assembly. The secondary module being operative to receive and store electrical power wirelessly from the primary module and transmit data wirelessly to the primary module. Further included is at least one sensor configured to be operatively attached to a portion of the aircraft component and electrically coupled to the secondary module. The at least one sensor receives operating electrical power from the secondary module and is operative to measure an operating parameter of the aircraft component and provide corresponding data to the secondary module.

BRIEF DESCRIPTION OF THE DRAWINGS

The objects and features of the invention can be understood with reference to the following detailed description of an illustrative embodiment of the present invention taken together in conjunction with the accompanying drawings in which.

WRITTEN DESCRIPTION OF CERTAIN EMBODIMENTS OF THE INVENTION

The present invention is now described more fully with reference to the accompanying drawings, in which an illustrated embodiment of the present invention is shown. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

It is to be appreciated and understood that the present invention, in accordance with the illustrated embodiments, is directed to a system and method for enabling wireless data and power transmission between a fuselage portion of an aircraft and an aircraft component, such as an aircraft landing gear assembly.

As will be apparent from the below description in accordance with the illustrated embodiments of FIGS. 1 to 5, the present invention is to be understood to be implemented in conjunction with the landing gear assembly 10 of an aircraft 100.

Figure 1:
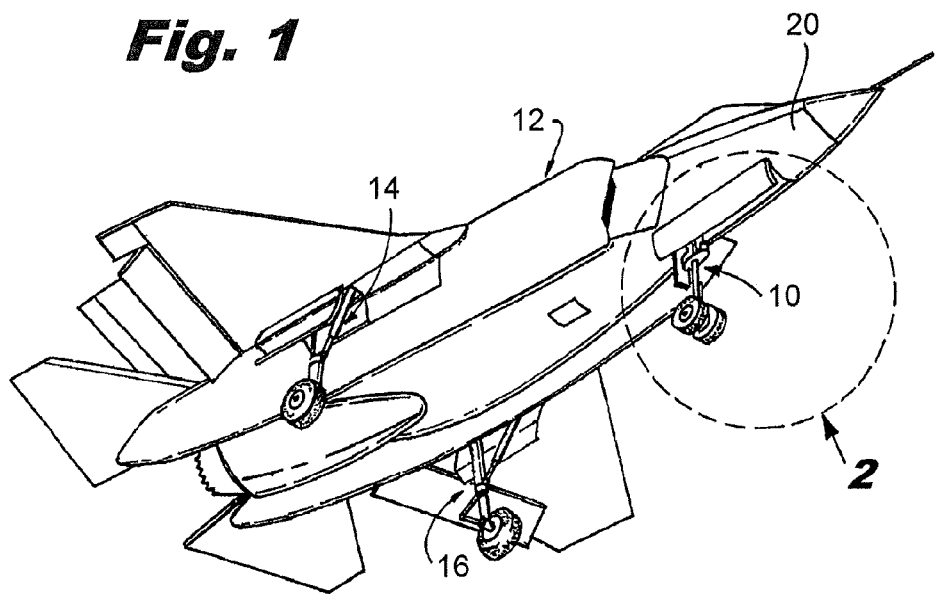
FIG. 1 is a perspective view of an aircraft.
Figure 2:
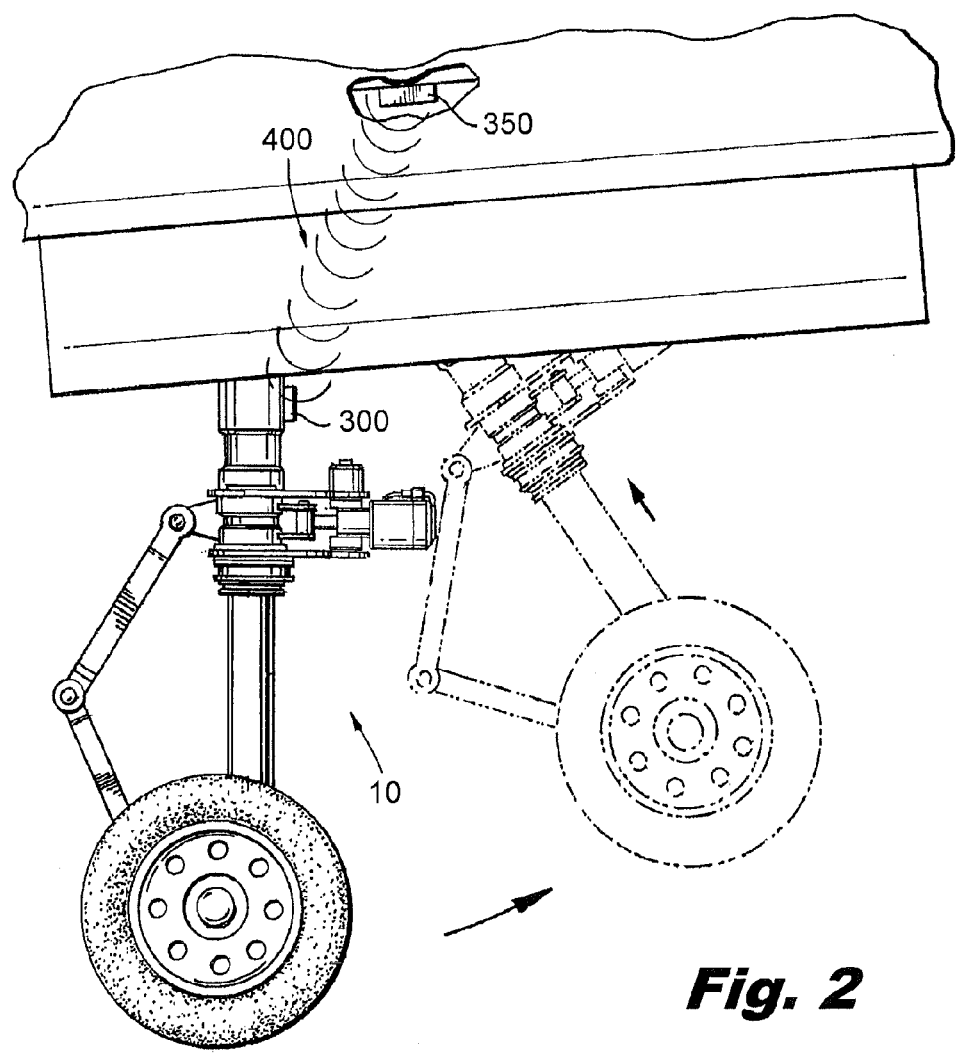
FIG. 2 is a partial view of the aircraft of FIG. 1 illustrating a landing gear assembly in an extended position with the present invention sensor system affixed thereto.

However, the present invention is not to be understood to be limited for use with an aircraft landing assembly as it may be used in conjunction with any component of the aircraft benefiting from its functionality. With reference to FIGS. 1 and 2, while the invention is illustrated for use with the front landing assembly 10 of aircraft 12, it is to be understood it may be implemented with the rear landing gear assemblies 14, 16, and any combination thereof. As is conventional, the landing gear assembly 10 is configured and operable to extend outwardly and retract inwardly relative to a landing gear bay 18 defined in the fuselage 20 of an aircraft 12. A mechanism assembly and system for causing such controlled movement of a landing gear assembly 10 is described in U.S. Pat. No. 5,908,174, entitled: AUTOMATIC SHRINK SHOCK STRUT FOR AN AIRCRAFT LANDING GEAR, which is to be understood to be incorporated herein by reference in its entirety.

Landing gear assembly 10 is understood to include a plurality of powered sensor devices 310, 312 each configured to measure performance parameters associated with the landing gear assembly 10. In accordance with the illustrated embodiments of the present invention, the powered sensor devices 310, 312 are to be understood to be located within the secondary module 300 affixed through any conventional means (e.g., screw assemblies, rivets, weld, glue and other like affixation means) to the landing gear assembly 10. Preferably, the secondary module 300 is mounted in close proximity to the movable components of the landing gear assembly 10 when retracted outwardly from the landing gear bay 18. It is to be appreciated and understood, the powered sensor devices 310, 312 are not to be understood to be limited to inclusion in to aforesaid secondary module 300, as it is to be understood, one or more of the powered sensors 310, 312 may be located external of the secondary module 300 with electrical power connection thereto.

Such powered sensor devices 310, 312 may include (but are not to be understood to be limited thereto): load sensors, brake and wheel motion sensors, tire pressure sensors, weight on wheel sensors and gear lock sensors. As mentioned above, and as further discussed below, each powered sensor device system 310, 312 typically requires connection to an electrical power source for operation thereof to measure and typically stores prescribed data. As is typical, each powered sensor device 310, 312 is coupled to an aircraft control system 200 for relaying determined and prescribed data from each sensor device system 310, 312 to the aircraft control system 200, which controls and monitors operation of the aircraft 12 thereof.

With continuing reference to FIGS. 1 and 2, a primary fixed module 350 is preferably affixed within the landing gear bay 18 through any conventional means (e.g., screw assemblies, rivets, weld, glue and other like affixation means). Preferably, the primary module 350 is mounted in close proximity to the movable components (and preferably the secondary module 300) of the landing gear assembly 10 when retracted within the landing gear bay 18 of aircraft 10, as shown in FIG, 3.

Figure 4:
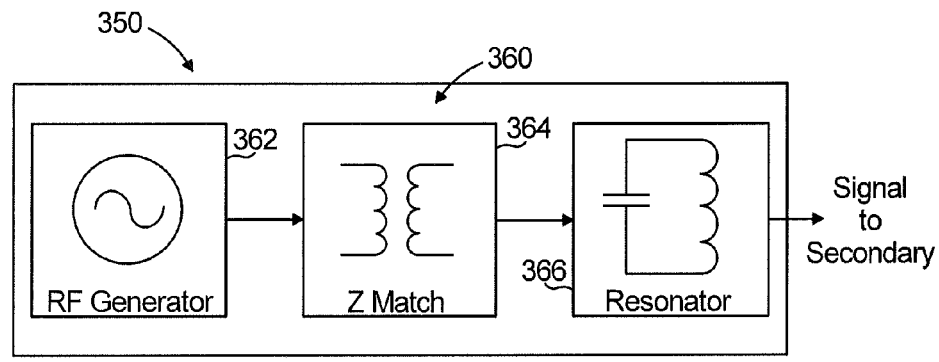
FIG. 4 is a schematic view illustrating an embodiment of the primary module of the present invention sensor system.
Figure 5:
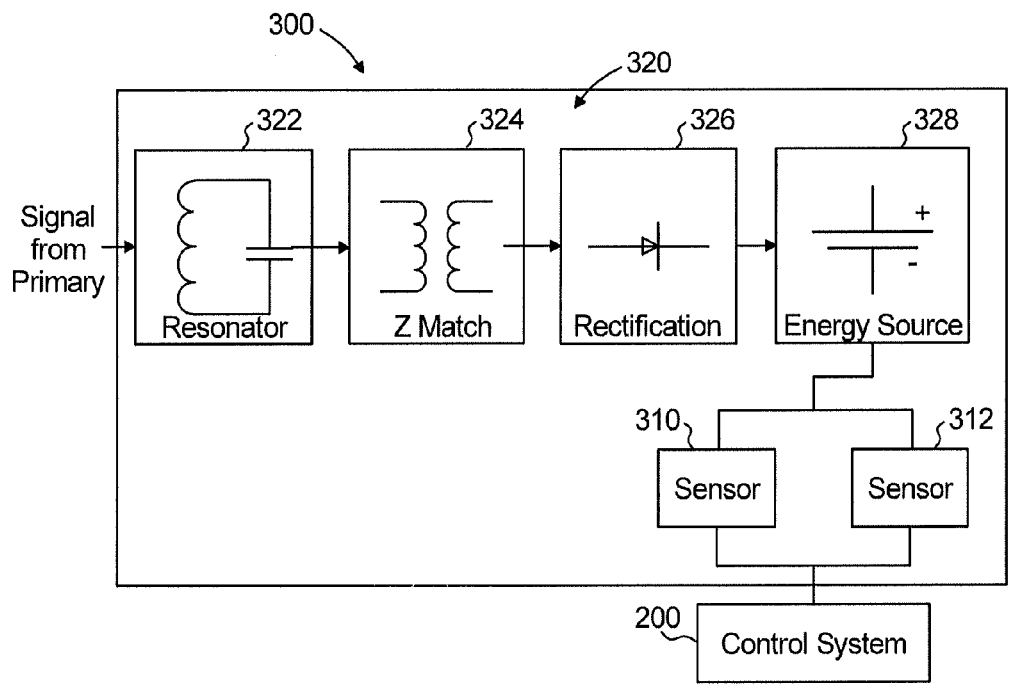
FIG. 5 is a schematic view illustrating an embodiment of the secondary module of the present invention sensor system.

With reference now to FIGS. 4 and 5, each primary 350 and secondary 300 module respectively includes inductive circuitry 360, 320. The inductive circuitry 360, 320 of primary 350 and secondary 300 modules are configured such that, using electrical inductive principles, electrical power is inductively transferred from the inductive circuitry 360 of the primary module 350 to the inductive circuitry 320 of the secondary module 320, such that electrical powered is stored for use with the aforesaid sensor device systems 310, 312, as also further discussed below. It is to be understood the two conductors of the inductive circuitry 360, 320 are commonly referred to as mutual-inductively coupled or magnetically coupled and they are configured such that a change in current flow through one of the conductors induces a voltage across the ends of the other conductor through electromagnetic induction. The amount of inductive coupling between two conductors of the inductive circuitry 360, 320 is typically determined by their mutual inductance. Additionally, it is to be understood the coupling between wires of the inductive circuits 360, 320 can be increased by winding them into coils and placing them close together on a common axis, so the magnetic field of one coil passes through the other coil.

The inductive circuitry 360 of the primary module 350 preferably includes an RF generator 362 coupled to a Z-Match circuit 364 coupled to a primary resonator coil 366. The inductive circuitry 320 of the secondary module 300 includes a secondary resonator coil 322 coupled to a Z-match circuit 324 which in turn is coupled to a rectifying circuit 326 coupled to a energy store device 328. It is to be understood and appreciated the energy storage device 328 can be a multitude of devices capable of storing electrical energy, such as a rechargeable battery or capacitor. The energy storage device 328 is coupled to each aforesaid sensor device system 310, 312 for providing electrical energy to power each sensor device system 310, 312. Thus, electrical power is transferred from the primary module 350 to the secondary module 300, via primary 366 and secondary 322 inductor coils, so as to be stored in the rechargeable energy source 328 for use by each sensor device system 310, 312.

Figure 3:
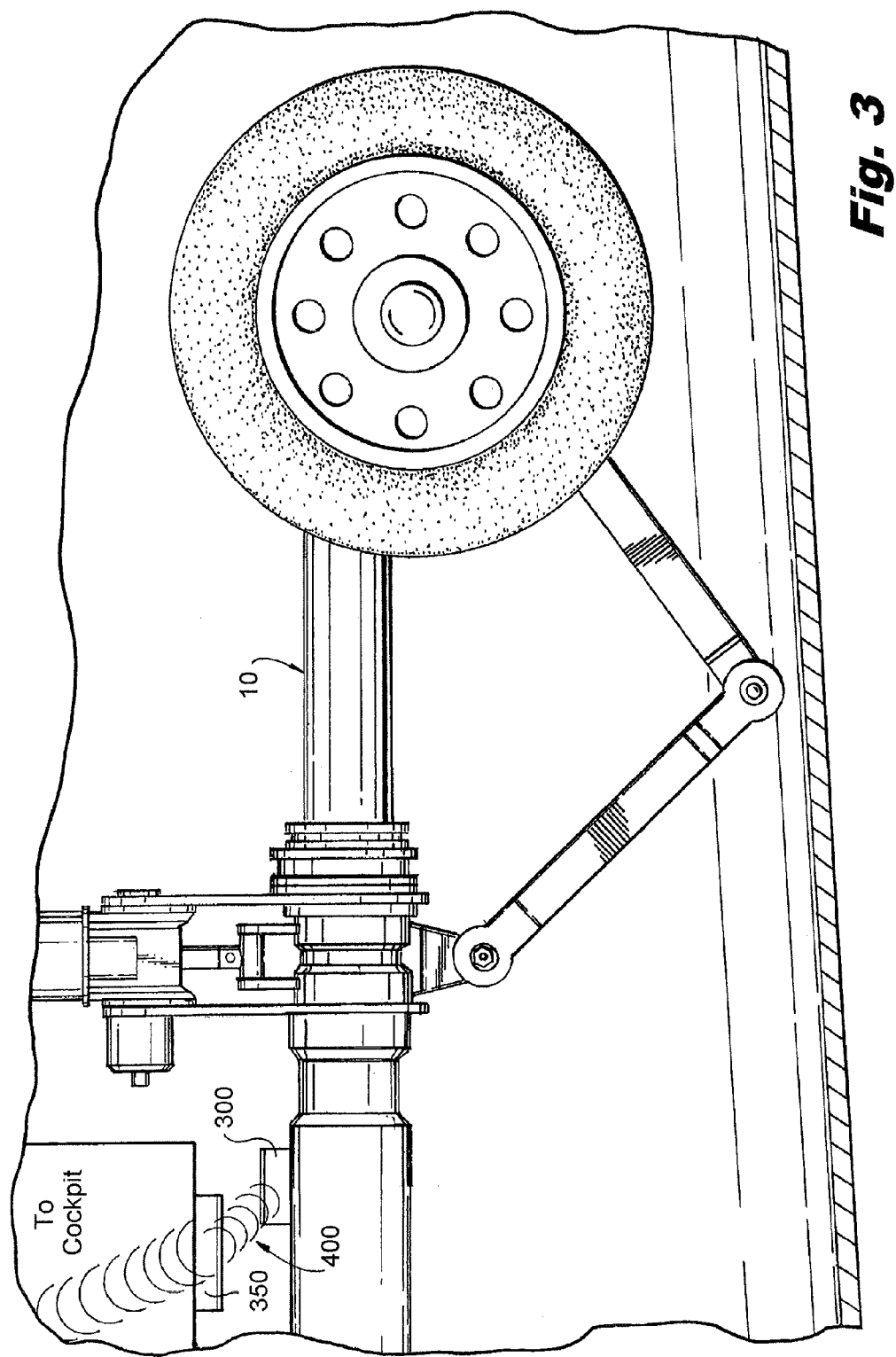
FIG. 3 is a cutaway view of the aircraft of FIG. 1 illustrating the landing gear assembly of FIG. 2 in a retracted position in the landing gear bay of the aircraft.

With the components of the invention described above, their method of use will now be described. With the landing gear assembly 10 in a retracted position in the landing gear bay 18 of aircraft 12, as indicated in FIG. 3, electrical power 400 is transferred from the primary module 350 to the secondary module 300, via primary 366 and secondary 322 inductor coils. This electrical power is then stored as energy in the rechargeable energy source component 328 of the secondary module 300.

With reference now to FIG. 2, when the landing gear assembly 10 is caused to be moved to its extended position, each sensor device system 310, 312 preferably becomes activated to sense and record prescribed data relating to the landing gear assembly 10. The electrical power for energizing each sensor device system 310, 312 is respectively provided from the rechargeable energy source 328 of the secondary module 300.

Figure 6:
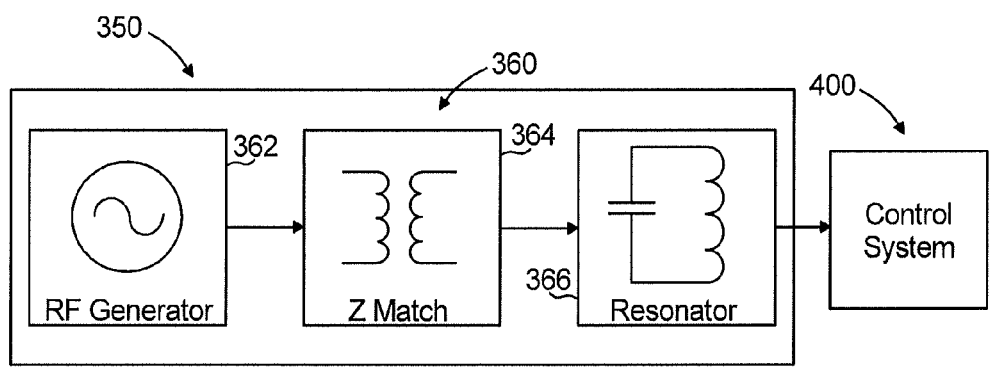
FIG. 6 is a schematic view illustrating another embodiment of the primary module of the present invention sensor system.

In another illustrated embodiment of the invention, and with reference to FIG. 6, it is to be further appreciated and understood that the primary 350 and secondary 300 modules are configured such that data which is collected by each sensor device system 310, 312 may communicate it's data to the control system 400 of aircraft 12 by a radio link using the inductive coupling between then primary 366 and secondary 322 inductor coils of the respective primary 350 and secondary 300 modules as the wireless transmission means. Once the radio signals are received in the primary module 350 from the sensor device systems 310, 312, they are provided to the aircraft control system 400 coupled thereto. It is to appreciated and understood the aforesaid wireless radio communication between each sensor device system 310, 312 and the aircraft control system 400 may occur whether the landing gear assembly 10 is retracted within the landing gear bay 18 of the aircraft 10 (FIG. 3) or extending outwardly therefrom (FIG. 2).

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

The above presents a description of a best mode contemplated for carrying out the present invention wireless power system for use with aircraft landing gear, and of the manner and process of making and using them, in such full, clear, concise, and exact terms as to enable any person skilled in the art to which it pertains to make and use these devices and methods. The present invention wireless power system is, however, susceptible to modifications and alternative method steps from those discussed above that are fully equivalent. Consequently, the present invention wireless power system is not limited to the particular embodiments disclosed. On the contrary, the present invention wireless power system encompasses all modifications and alternative constructions and methods coming within the spirit and scope of the present invention.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function, it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. An aircraft sensor system, the system comprising:
   a primary module configured to be attached to an aircraft portion, the primary module operative to transmit electrical power wirelessly;
   a secondary module configured to be attached to an aircraft component, the secondary module operative to receive electrical power wirelessly from the primary module when the aircraft component is in a first position;
   at least one sensor configured to be operatively attached to a portion of the aircraft component and electrically coupled to the secondary module, wherein the at least one sensor is operative to measure a desired parameter of the aircraft component; and
   a power storage module configured to be mounted in close proximity to the aircraft component and being electrically coupled to the at least one sensor, the power storage module operative to provide electrical power to the at least one sensor when the aircraft component is in a second position in which the secondary module cannot receive sufficient electrical power wirelessly from the primary module.

2. The aircraft sensor system of claim 1, wherein the primary module and secondary module are operative to transfer electrical power wirelessly by inductive coupling.

3. The aircraft sensor system of claim 1, wherein the primary module and secondary module are operative to transfer electrical power wirelessly by resonant inductive coupling.

4. The aircraft sensor system of claim 1, wherein the aircraft component is a retractable landing gear assembly.

5. The aircraft sensor system of claim 1, wherein the primary module is configured to be mounted in close proximity to the secondary module.

6. The aircraft sensor system of claim 1, wherein the power storage module includes at least one rechargeable battery configured to store electrical power.

7. The aircraft sensor system of claim 1, wherein the power storage module includes at least one capacitor configured to store electrical power.

8. The aircraft sensor system of claim 1, wherein the power storage module is configured to provide electrical power to the at least one sensor during periods when the secondary module is not receiving electrical power from the primary module.

9. The aircraft sensor system of claim 1, wherein the secondary module is configured to charge the power storage module with electrical power received from the primary module.

10. An aircraft sensor system, the system comprising:
    a primary module configured to be attached to an aircraft portion, the primary module operative to transmit electrical power wirelessly and operative to receive data wirelessly;
    a secondary module configured to be attached to an aircraft component, the secondary module operative to receive electrical power wirelessly from the primary module when the aircraft component is in a first position, the secondary module further configured to transmit data wirelessly to the primary module;
    at least one sensor configured to be operatively attached to a portion of the aircraft component and electrically coupled to the secondary module, wherein the at least one sensor is operative to measure a desired parameter of the aircraft component and provide corresponding data to the secondary module; and
    a power storage module configured to be mounted in close proximity to the aircraft component and being electrically coupled to the at least one sensor, the power storage module operative to provide electrical power to the at least one sensor when the aircraft component is in a second position in which the secondary module cannot receive sufficient electrical power wirelessly from the primary module.

11. The aircraft sensor system of claim 10, wherein the primary module and secondary module are operative to transfer electrical power wirelessly by resonant inductive coupling.

12. The aircraft sensor system of claim 10, wherein the primary module is operative to transmit data wirelessly and the secondary module is operative to receive data wirelessly.

13. The aircraft sensor system of claim 10, wherein the aircraft component is a retractable landing gear assembly.

14. The aircraft sensor system of claim 10, wherein the primary module is configured to be mounted proximal to the secondary module.

15. The aircraft sensor system of claim 10, wherein the power storage module includes at least one rechargeable battery configured to store electrical power.

16. The aircraft sensor system of claim 10, wherein the power storage module includes at least one capacitor configured to store electrical power.

17. The aircraft sensor system of claim 10, wherein the power storage module is configured to provide electrical power to the at least one sensor during periods when the secondary module is not receiving electrical power from the primary module.

18. The aircraft sensor system of claim 10, wherein the secondary module is configured to charge the power storage module with electrical power received from the primary module.

* * * * *